(12) United States Patent
Yang et al.

(10) Patent No.: US 8,060,098 B2
(45) Date of Patent: Nov. 15, 2011

(54) HANDOVER METHODS AND APPARATUS FOR MOBILE COMMUNICATION DEVICES

(75) Inventors: Lianghua Yang, Kitchener (CA); Wenjie Huang, Kitchner (CA)

(73) Assignee: Research In Motion Limited, Waterloo, Ontario (CA)

( * ) Notice: Subject to any disclaimer, the term of this patent is extended or adjusted under 35 U.S.C. 154(b) by 787 days.

(21) Appl. No.: 11/332,429

(22) Filed: Jan. 13, 2006

(65) Prior Publication Data

US 2007/0167165 A1  Jul. 19, 2007

(51) Int. Cl.
*H04W 36/00* (2009.01)
*H04W 4/00* (2009.01)

(52) U.S. Cl. ........ 455/439; 455/436; 455/437; 455/442; 370/331

(58) Field of Classification Search .................. 455/436, 455/437, 439, 442; 370/331
See application file for complete search history.

(56) References Cited

U.S. PATENT DOCUMENTS

| | | | |
|---|---|---|---|
| 5,081,679 A * | 1/1992 | Dent ............................ | 380/272 |
| 5,182,753 A | 1/1993 | Dahlin et al. | |
| 5,546,464 A | 8/1996 | Raith et al. | |
| 5,570,467 A | 10/1996 | Sawyer | |
| 6,438,117 B1 * | 8/2002 | Grilli et al. ..................... | 370/331 |
| 6,496,551 B1 * | 12/2002 | Dam et al. ..................... | 375/347 |
| 6,708,030 B1 * | 3/2004 | Horikawa ...................... | 455/436 |
| 6,885,866 B1 * | 4/2005 | Wikstedt et al. ............... | 455/436 |
| 7,031,665 B1 | 4/2006 | Trell | |
| 7,062,282 B2 | 6/2006 | Liu et al. | |
| 7,236,746 B2 | 6/2007 | Peric | |
| 2002/0032030 A1 * | 3/2002 | Berglund et al. .............. | 455/434 |
| 2003/0002525 A1 * | 1/2003 | Grilli et al. .................... | 370/465 |
| 2003/0108006 A1 * | 6/2003 | Holcman et al. .............. | 370/331 |
| 2004/0038682 A1 * | 2/2004 | Persson et al. ................ | 455/436 |
| 2004/0095953 A1 | 5/2004 | Bellier et al. | |
| 2004/0160925 A1 * | 8/2004 | Heo et al. ...................... | 370/335 |
| 2004/0162073 A1 * | 8/2004 | Yoneyama et al. ............ | 455/436 |
| 2004/0184423 A1 * | 9/2004 | Tiedmann et al. ............ | 370/331 |

(Continued)

OTHER PUBLICATIONS

"FAACH Signalling" The GSM System for Mobile Communications Michel Mouly, Marie-Bernadette Pautet Cell & Sys, Copyright 1992.*

(Continued)

*Primary Examiner* — Erika Gary
*Assistant Examiner* — Michael Mapa
(74) *Attorney, Agent, or Firm* — John J. Oskorep, Esq.

(57) ABSTRACT

A mobile communication device assists in a handover procedure between a first base station and a second base station using reliable and efficient techniques. The mobile device has a wireless transceiver and one or more processors coupled to the wireless transceiver. In one illustrative example, the one or more processors of the mobile device are operative to maintain a voice or data call over a traffic channel with use of the wireless transceiver; cause handover information of the handover procedure to be transmitted over a first control channel (e.g. SACCH) with use of the wireless transceiver during the voice or data call; and cause the same handover information of the handover procedure to be transmitted over a second control channel (e.g. FACCH) during the voice or data call. Further, the one or more processors may be operative to cause a message for the handover procedure to be transmitted in a layer-2 (L2) frame with use of the wireless transceiver during the voice or data call; and cause updated system information (e.g. an updated BA list) to be transmitted in the L2 frame with use of the wireless transceiver during the voice or data call.

41 Claims, 8 Drawing Sheets

U.S. PATENT DOCUMENTS

| | | | |
|---|---|---|---|
| 2005/0009523 A1 | 1/2005 | Pekonen | |
| 2005/0101328 A1* | 5/2005 | Son et al. | 455/436 |
| 2005/0111409 A1* | 5/2005 | Spear et al. | 370/331 |
| 2005/0180351 A1 | 8/2005 | Peric | |
| 2005/0202839 A1* | 9/2005 | Merboth et al. | 455/522 |
| 2006/0251008 A1* | 11/2006 | Wu et al. | 370/328 |

OTHER PUBLICATIONS

Extended European Search Report, EPO Application # 06250167.1, Nov. 16, 2006.

3GPP Technical Specification Group, TS 04.18, GSM/EDGE Radio Access Network, Mobile radio interface layer 3 specification, Radio Resource Control Protocol (Release 1999).

Examination Report, EPO Application #06250167.1, Apr. 3, 2009.
3GPP Technical Specification Group, TS 04.06, GSM/EDGE Radio Access Network, Mobile Station—Base Station System (MS-BSS) interface, Data Link (DL) layer specification (Release 1999).

* cited by examiner

HANDOVER METHODS AND APPARATUS FOR MOBILE COMMUNICATION DEVICES

BACKGROUND

1. Field of the Technology

The present invention relates generally to mobile communication devices operating in wireless communication networks, and more particularly to improve handover methods and apparatus for mobile stations.

2. Description of the Related Art

A mobile communication device, such as a mobile station operating in a wireless communication network, may provide for both voice telephony and packet data communications. A mobile station may, for example, be compatible with $3^{rd}$ Generation (3G) communication standards and utilize Global System for Mobile Communications (GSM), Time Division Multiple Access (TDMA), Frequency Division Multiple Access (FDMA) wireless network technologies.

All of these communication standards utilize radio frequency (RF) signal detection techniques. In a mobile RF transceiver or mobile station (MS), a handoff or handover procedure exists in order to accomplish continuous communications as the MS is en route between various cell sites of one or more wireless communication networks. The handover procedure utilizes receiver signal strength indicator (RSSI) for serving cell and neighbor cell measurements, and received signal quality (RXQUAL) for serving cell measurements taken within the MS. The MS periodically monitors the RSSI on its active channel and that of its neighboring channels, and sends the selected RSSI information and RXQUAL to a base station (BS) that is part of the wireless communication network, such as a Global System for Mobile Communications (GSM) network. A BS receives RSSI information reported from the MS and decodes and delivers those messages to a base station controller (BSC). The BSC compiles the RSSI and RXQUAL information received from the MS and decides when and if a handover procedure should be initiated for the MS. If the RSSI level and/or RXQUAL on the active channel drops below a predefined threshold level, indicating poor signal-to-noise ratio in the MS receiver, then the BSC will initiate a handover procedure to begin between the active BS and the MS.

In GSM networks, handover procedures are coordinated by the BSC and through communications between the BS and MS by the sending of handover command messages over a fast associated control channel (FACCH). After the BS sends an initial handover command to the MS to begin the handover procedure, a series of handover command messages are exchanged between the MS and the BS (also referred to as a handshaking process). The handover procedure eventually concludes with the MS being assigned to a neighboring channel and/or base station. Each handover command message requires eight continuous FACCH bursts on a full rate traffic channel (TCH) or six continuous FACCH bursts on a half rate TCH. Unfortunately, FACCH bursts are susceptible to instantaneous interference products such as radio interference or radio propagation fading and blocking, and may be missed or corrupted during their short transmission time (approximately 40 ms). When handover commands are lost or damaged, the handover procedure may be prolonged and delayed due to repeat handover attempts, which causes degraded signal quality during the call. In more extreme situations, the communication link may be lost altogether, which results in a dropped call.

Further, much information exchange is required after each and every handover procedure in order to instruct the MS of a new neighboring channel list. In GSM networks, this list is referred to as a broadcast control channel (BCCH) allocation (BA) list. Traditional procedures provide for the transfer of the new BA list following the final handover command message. This further delays the completion of the procedure and delays use of the MS for voice and data communications, and delays valid radio measurements. In GSM networks, the BA list transfer is performed on the slow associated control channel (SACCH) and can take an additional 1.44 s. The additional time required to update the MS with the new BA list can be long enough to cause a drop in the communications link during weak RF signal conditions or in congested RF traffic areas.

Accordingly, what are needed are methods and apparatus for performing a successful handoff between cells so as to overcome the deficiencies in the prior art.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

A mobile communication device assists in a handover procedure between a first base station and a second base station using reliable and efficient techniques. The mobile device has a wireless transceiver and one or more processors coupled to the wireless transceiver. In one illustrative example, the one or more processors of the mobile device are operative to maintain a voice or data call over a traffic channel with use of the wireless transceiver; cause handover information of the handover procedure to be transmitted over a first control channel (e.g. FACCH) with use of the wireless transceiver during the voice or data call; and cause the same handover information of the handover procedure to be transmitted over a second control channel (e.g. SACCH) during the voice or data call. Further, the one or more processors may be operative to cause a command message for the handover procedure to be transmitted in a layer-2 (L2) frame with use of the wireless transceiver during the voice or data call; and cause updated system information (e.g. an updated BA LIST) to be transmitted in the L2 frame with use of the wireless transceiver during the voice or data call.

Figure 1:
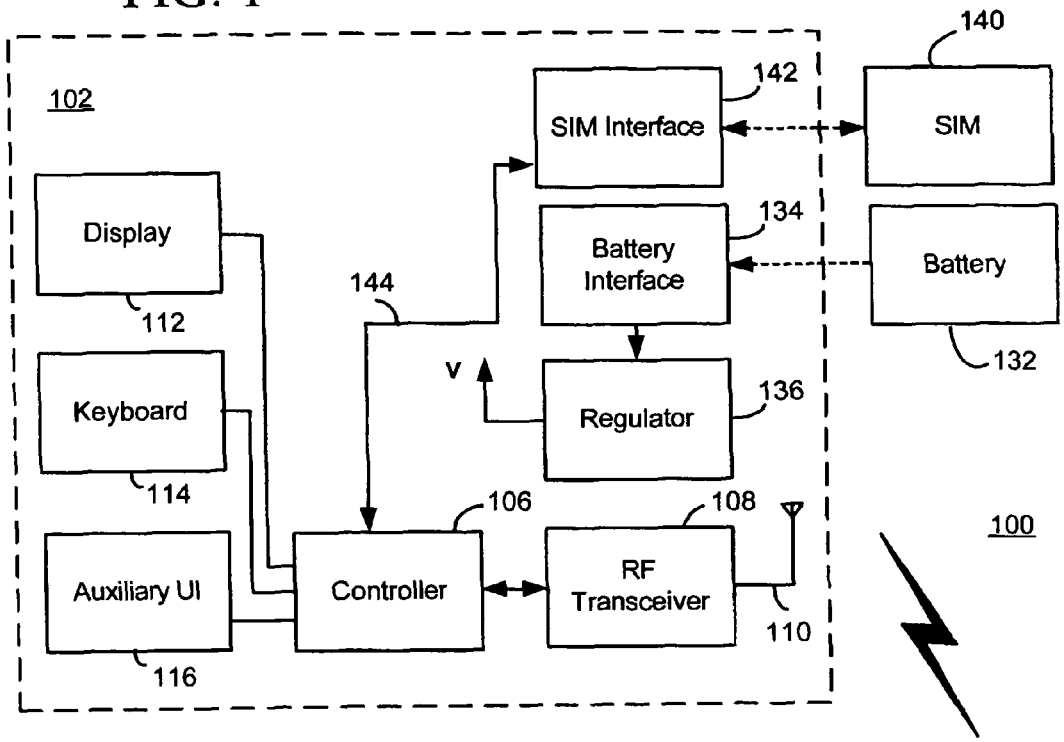
FIG. 1 is a block diagram which illustrates pertinent components of a mobile station and a wireless communication network.
Figure 1:
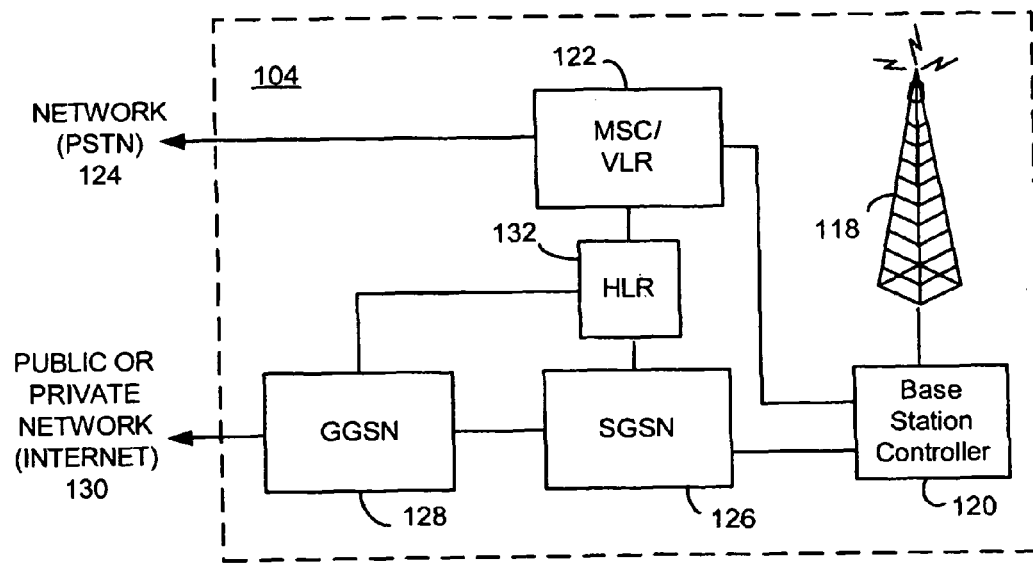

FIG. 1 is a block diagram of a communication system 100 which includes a mobile station 102 (one type of wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 4.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118

(i.e. or station sector), depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 may perform authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
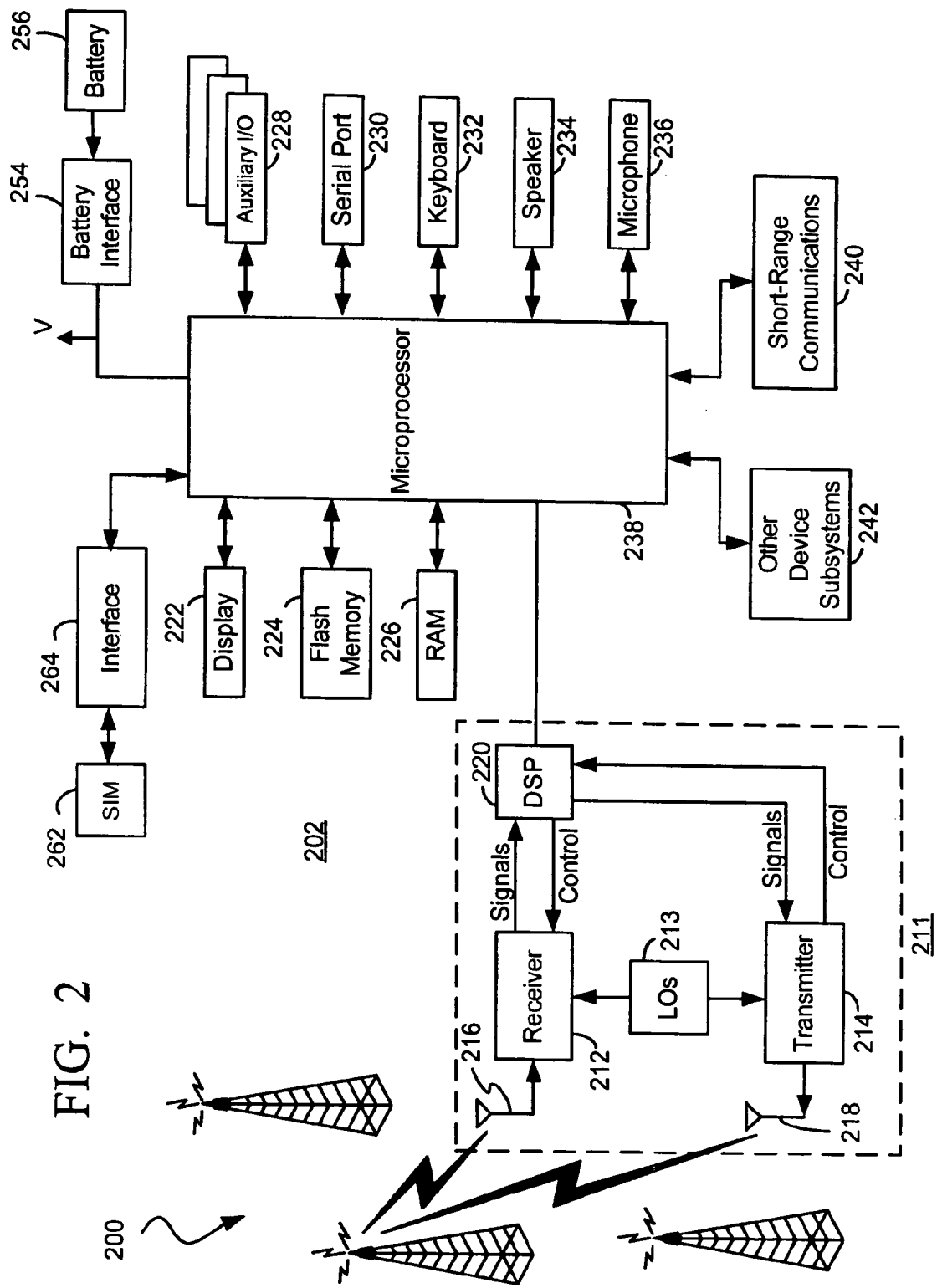
FIG. 2 is a more detailed diagram of a preferred mobile station of FIG. 1.

FIG. 2 is a detailed block diagram of a preferred mobile station 202 of the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V to all of the circuitry.

Mobile station 202 includes a microprocessor 238 (which is one implementation of controller 106 of FIG. 1) which controls overall operation of mobile station 202. Microprocessor 238 also has primary control for the handover procedure of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as a network reestablishment scheme of the present application, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, short-range communications subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
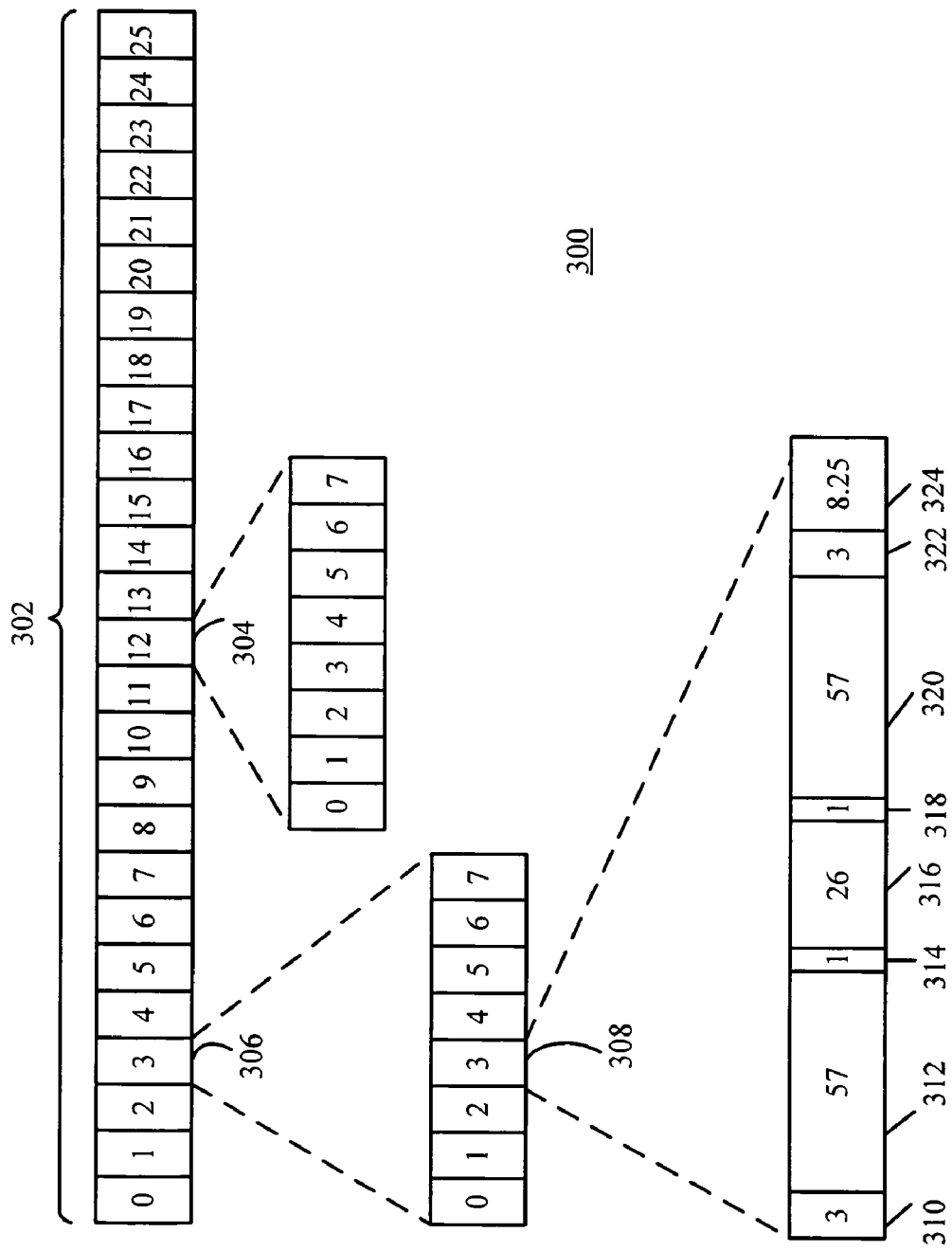
FIG. 3 is an illustration of frame formatting for a particular wireless communication network, namely a Global Systems for Mobile Communications (GSM) network.

FIG. 3 is an illustration of a frame format structure 300 of a GSM physical channel. Each row of blocks in frame format structure 300 represents a series of data bits that show a specific structure of a GSM transmitted message. One level of the frame format structure 300 is shown in the top level of this diagram and is defined in GSM standards as a traffic multiframe 302. Each block within traffic multiframe 302 represents a series of data bits that are part of a GSM transmitted message. Each series of data bits consumes a specified time during each transmission as defined in GSM standards documents. Therefore, the bit pattern blocks shown in each row of frame format structure 300 are time-dependent-place-holders containing data bits.

The structure of GSM traffic multiframe 302 contains twenty-six frames, wherein frames zero through eleven and thirteen through twenty-four are used for voice or data information. GSM traffic multiframe 302 contains twenty-four traffic channel frames, one control channel frame, and one idle frame. Frame twelve is used to send slow associated control channel (SACCH) commands, and frame twenty-five is an idle frame. Duration of GSM traffic multiframe 302 is 120 ms. Each frame is 60/13 ms in duration (120 ms/multiframe÷26 frames/multiframe). A traffic channel frame 306 is shown as a series of eight slots, which is representative of all other GSM traffic frames. A control channel 304 is the location of the SACCH (referred to herein as a second control channel), and is located in frame twelve of each multiframe. Since the SACCH is located once per GSM traffic multiframe, one multiframe duration of 120 ms is equivalent to one SACCH burst period.

Each frame consists of eight slots, such as a slot 308. Each slot is 15/26 ms in duration (60/13 ms/frame÷8 slots/frame). Slot 308 is an example of a typical GSM transmission slot. Slot 308 consists of a set of three tail bits 310, a set of fifty-seven data or voice bits 312, one stealing or flag bit 314, twenty-six training bits 316, a second stealing or flag bit 318, a second set of fifty-seven data or voice bits 320, a second set of three tail bits 322, and eight and one-fourth guard bits 324, for a total of 156.25 bits per slot. Each bit duration is 3.69 µs (15/26 ms/slot÷156.25 bits/slot). During each slot, voice or data information is sent in each set of fifty-seven data or voice bits 312 and 320. So, for each slot duration, one hundred and fourteen bits are transmitted or received by the base or mobile station. Each set of fifty-seven data or voice bits 312 and 320 is sometimes used for sending station control information. The content of each set of fifty-seven data or voice bits 312 and 320 is determined in each slot by the polarity of each corresponding stealing or flag bits 314 and 318 for that particular slot and only that slot.

Another control channel of the GSM network is a fast associated control channel (FACCH) (referred to herein as a first control channel). Station control commands are sent over the FACCH when lengthy signaling is required between a GSM mobile and the network while the mobile is in call. Station control commands may be sent over the first control channel, FACCH, or the second control channel, SACCH. FACCH commands can perform similar functions that the SACCH commands can perform, but at a much quicker rate. FACCH uses one or both sets of fifty-seven data or voice bits 312 and 320 per slot to send command messages. Each slot duration is 577 μs compared to multiframe duration of 120 ms. The drawback to using FACCH for station control operation is that it uses or steals the voice or data bits during the transmission, which can degrade communications quality of the call.

Thus, a first encoding format, FACCH encoding format, is representative of one type of encoding format, and a second encoding format, SACCH encoding format, is representative of another type of encoding format different from it. Information that is formatted in accordance with the FACCH encoding format is spread over a first time period, and information that is formatted in accordance with the SACCH encoding format is spread over a second time period that is greater than the first time period.

Figure 4:
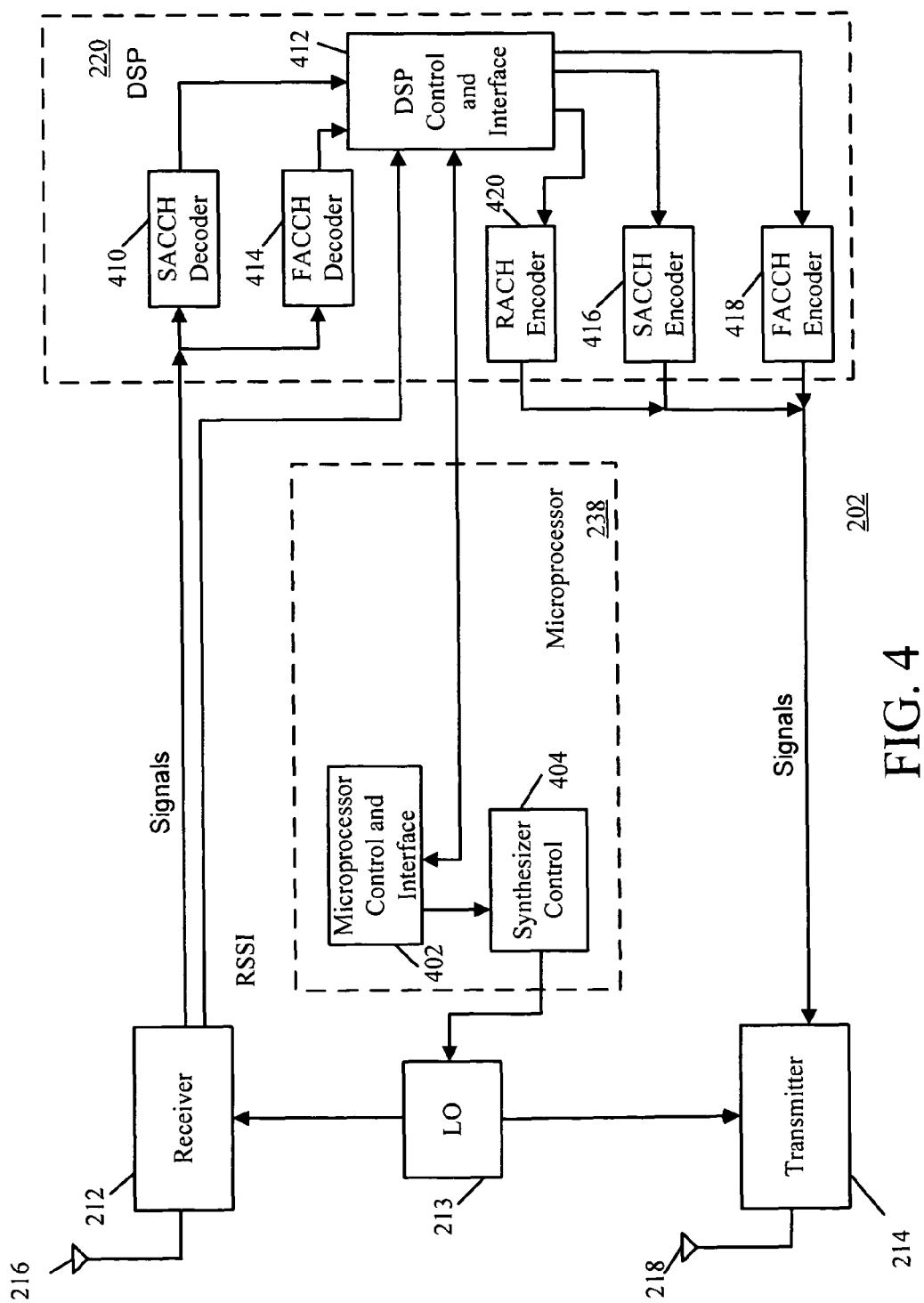
FIG. 4 is a schematic block diagram of pertinent components of the mobile station for performing a handover procedure of the present application.

FIG. 4 is a schematic block diagram of pertinent components in the handover methods and apparatus of the present application. As shown in FIG. 4, several components are the same as those shown and described in relation to FIG. 2 where reference numerals depict like components. Pertinent processes and components of the present application shown in FIG. 4 include a slow associated control channel (SACCH) decoder 410 for decoding the incoming SACCH commands, a fast associated control channel (FACCH) decoder 414 for decoding the incoming FACCH commands, a SACCH encoder 416 for providing the outgoing SACCH commands, a FACCH encoder 418 for providing the outgoing FACCH commands, and a random access channel (RACH) encoder 420 for providing the outgoing RACH commands. Other components include a microprocessor control and interface block 402 for communications between the microprocessor and DSP as well as between the microprocessor and other circuit blocks, a synthesizer control block 404 for programming the proper local oscillator frequencies, and a DSP control and interface block 412 for processing the incoming and outgoing SACCH and FACCH commands. As apparent, as handover procedure processing is included within one or more processors, computer instructions stored in memory may be utilized to execute techniques of the present application.

For SACCH and FACCH encoding and decoding purposes, SACCH decoder 410, FACCH decoder 414, SACCH encoder 416, FACCH encoder 418, RACH encoder 420 and DSP control and interface block 412 are shown as processes in DSP 220 (i.e. the baseband signal processor). Microprocessor control and interface block 402 and synthesizer control block 404 are shown as processes in microprocessor 238. Microprocessor control and interface block 402 will perform such tasks as interfacing between the microprocessor 238 and DSP 220 during SACCH and FACCH encoding and decoding, receiving information from DSP 220 during handover procedures, interfacing with the synthesizer control block 404 to load new channel information into synthesizers that would drive the LOs, store neighbor channel lists during handover procedures, and receive information from receiver 212 indicating whether or not a good channel is being received based on the RSSI signal and RXQUAL. DSP control and interface block 412 will perform such tasks as relaying RSSI and RXQUAL information to microprocessor 238, processing the decoded SACCH or FACCH messages, passing the decoded SACCH or FACCH messages on to microprocessor 238 via microprocessor control and interface block 402, sending SACCH data to SACCH encoder 416, sending FACCH data to FACCH encoder 418, sending RACH data to RACH encoder 420, and sending decoded layer-2 (L2) data to the microprocessor 238 via microprocessor control and interface block 402.

Before the handover procedure takes place, the mobile station (MS) is active in a voice or data call. GSM data calls involve a circuit switched or high speed circuit switched connection in the network. Receiver 212, transmitter 214, LO 213 and selected processes within microprocessor 238 and selected processes within DSP 220 are active and operating as needed for the type of communications. In the receiver path, antenna 216 delivers radiated energy from a surrounding region to receiver 212. A receiving channel of receiver 212 is determined by a reference RF signal delivered by the microprocessor-controlled LO 213. Microprocessor control and interface block 402 is coupled to and provides proper signaling and control signals to LO 213 so that desired channel reference signals are presented to receiver 212. Receiver 212 is coupled to and provides a radio signal strength indicator (RSSI) control line to DSP control and interface block 412 within DSP 220.

Mobile station 202 periodically and routinely sends RSSI and received signal quality (RXQUAL) information to its serving base station (BS), which is analogous to station 118 of FIG. 1. The BS then passes this RSSI and RXQUAL information to a base station controller (BSC) and/or mobile switching center (MSC), where that information is stored and used to determine if active MSs on the system are optimized for best signal quality. In order to provide the RSSI information to the BS, DSP control and interface block 412 sends digitized RSSI information to microprocessor control and interface block 402, which sends similar or the same digitized RSSI information to DSP control and interface block 412, which sends similar or the same digitized RSSI information to SACCH encoder 416. SACCH encoder 416 then converts the digitized RSSI information to SACCH messages. SACCH encoder 416 sends SACCH messages to transmitter 214, which receives the SACCH messages and accordingly modulates an RF signal. The modulated RF signal is then sent through antenna 218 to the base station of the GSM wireless network. If the RSSI and/or RXQUAL level on the current channel is lower than a predetermined threshold level, the BSC/MSC will instruct the BS to begin a handover procedure to switch the mobile station to a neighboring channel or system.

Once the handover procedure is initiated by the BSC or MSC, the serving BS sends an initial handover instruction to the MS, encoded as a FACCH message. The MS will receive the signal as a modulated RF signal on antenna 216. Receiver 212 sends a demodulated FACCH message to FACCH decoder 414. FACCH decoder 414 sends a decoded instruction to DSP control and interface block 412. DSP control and interface block 412 is coupled to microprocessor control and interface block 402 for the purpose of bidirectional communications in handling programmable processes and functions. When DSP control and interface block 412 receives a decoded handover initiation command message from FACCH decoder 414, MS programming in microprocessor 238 and DSP 220 or an external memory device (not shown) is adapted to respond to the handover initiation command message by instructing a handover acknowledge command message to be encoded by RACH encoder 420. RACH encoder 420 sends a RACH access message to transmitter 214, where it is converted to a modulated RF signal and sent through antenna 218 to the GSM wireless network.

The process where the MS receives command messages or commands from the BS, and then the MS responds to the BS with command messages or commands, is a process which may be referred to as handshaking between the MS and BS in order to perform necessary network functions such as a handover procedure. Once the handover initiation command message is received, decoded, and acknowledged by the MS by encoding a response command message and transmitting it to the BS, the process will continue until the handover procedure is complete with a result which could be a successful handover, or a failed handover. The handover procedure will, in most cases, conclude with the MS being assigned to a neighboring channel or BS within the same network, or on a channel or BS within a neighboring network, with no interruption in service while retaining sufficient signal quality.

In general, handover command messages and other channel information may be delivered as SACCH messages over the SACCH, as FACCH messages over the FACCH or as RACH messages over the RACH. When the handover command messages are delivered from the BS to the MS via SACCH commands, the handover procedure is the same as described above for FACCH decoding (in FIG. 4) except that the demodulated receive signal is presented to SACCH decoder 410, and a handover instruction is then sent from SACCH decoder 410 to DSP control and interface block 412. When handover command messages are sent from the MS to the BS via SACCH commands, the handover procedure is the same as stated above for FACCH encoding (in FIG. 4) except that the DSP control and interface block 412 instructs SACCH encoder 416 to send a SACCH message to transmitter 214. When handover command messages are sent from the MS to the BS via RACH commands, the handover procedure is the same as stated above for FACCH encoding (in FIG. 4) except that the DSP control and interface block 412 instructs RACH encoder 420 to send a RACH message to transmitter 214.

Thus, in the present application, some handover procedure command messages are received by the receiver 212 on both the FACCH and the SACCH. When this occurs, receiver 212 conveys a SACCH message to SACCH decoder 410 and a FACCH message to FACCH decoder 414. Upon receiving the handover command message, one or both of SACCH decoder 410 and FACCH decoder 414 will send a handover instruction to DSP control and interface block 412 and then to microprocessor 238. Some handover command messages may also be sent from the MS to the BS on both the FACCH and the SACCH. This technique is the same as described above except that DSP control and interface block 412 instructs FACCH encoder 418 to send a FACCH message over the FACCH and instructs SACCH encoder 416 to send a SACCH message over the SACCH to transmitter 214.

Note that when the handover information is communicated (sent or received) "simultaneously" or substantially at the same time over both the SACCH and FACCH, there is at least some time period of overlap between the sending or receiving of the information over the different channels. When there is a failure in receiving the handover information of the handover procedure over the first control channel, the handover information of the handover procedure received over the second control channel is processed for performing the handover procedure. On the other hand, when there is a failure in receiving the handover information of the handover procedure over the second control channel, the handover information of the handover procedure received over the first control channel is processed for performing the handover procedure. Advantageously, the handover procedures of the present application decrease the amount of time needed for the handover procedure to occur and improve the reliability of the same.

Another part of MS operation relates to use of RSSI and RXQUAL information which is regularly sent from the MS to the BS. The BS passes on all RSSI and RXQUAL information from every MS in the wireless network to its BSC/MSC. The MSC in a GSM system controls one or more BSCs, which control one or more base transceiver stations (BTS or BS). Handover decisions are made at the BSC level or MSC level within the GSM network, depending on physical origination and destination of the handover procedure. There are four different types of handover procedures in a GSM wireless network, and they involve transferring a call between (1) channels (time slots) of the same cell; (2) cells under the control of the same BSC; (3) cells under the control of different BSCs, but belonging to the same MSC; (4) and cells under the control of different MSCs. The first two types of handovers (1) and (2), called internal handovers, involve only one BSC. To save signaling bandwidth, they are managed by the BSC without involving the MSC, except to notify it at the completion of the handover. The last two types of handovers (3) and (4), called external handovers, are handled by the MSCs involved.

Handovers can be initiated by either the BSC, or the MSC (e.g. as a means of traffic load balancing). During its idle time slots, the MS scans the Broadcast Control Channel (BCCH) of up to 16 neighboring cells and forms a list of the six best candidates for possible handover based on the RSSI. This RSSI and RXQUAL information is passed to the BSC and/or the MSC and used by the handover procedure. The BSC and/or MSC uses the RSSI information from each MS to determine if and when a handover procedure should begin for any particular MS. The BSC or MSC operation may involve monitoring the RSSI and RXQUAL information; identifying whether the RSSI is sufficient for quality communications for the MS and, if the RSSI and/or RXQUAL is not sufficient as defined by a predetermined threshold, initiating a handoff procedure for the MS to a neighboring BS or system where the RSSI will be sufficient for quality communications; and repeating the acts of monitoring, identifying, and initiating to ensure quality communications for the MS. Once the BSC or MSC determines that a handover procedure is necessary for any active MS in the system, the BSC or MSC instructs the BS to begin the handover procedure for the MS. The handover procedure is illustrated in flowcharts of FIGS. 5 and 6 from both the MS perspective (FIG. 5) and the BS perspective (FIG. 6).

Figure 5:
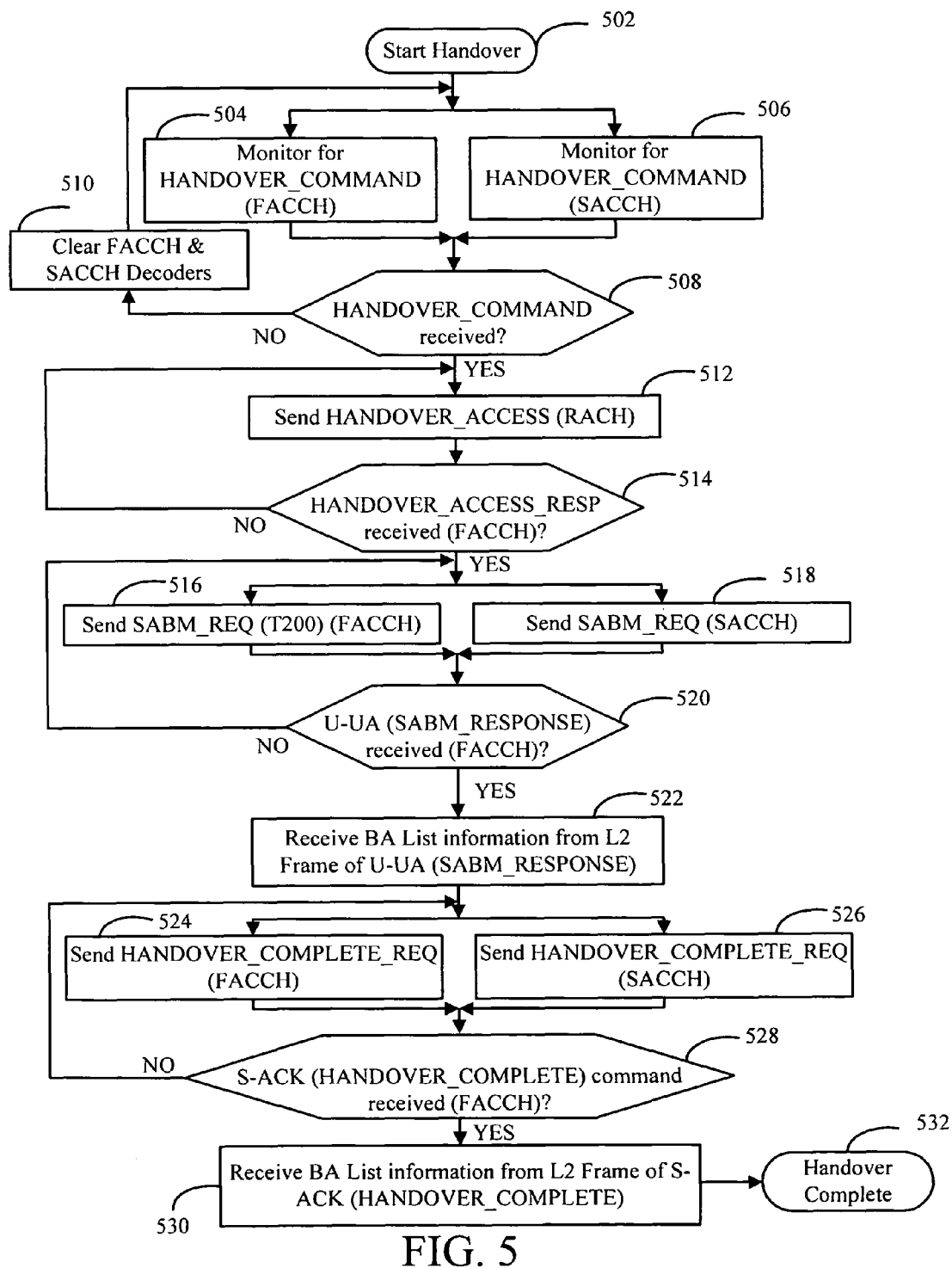
FIG. 5 is a flowchart of the handover procedure of the present application for the mobile station.
Figure 6:
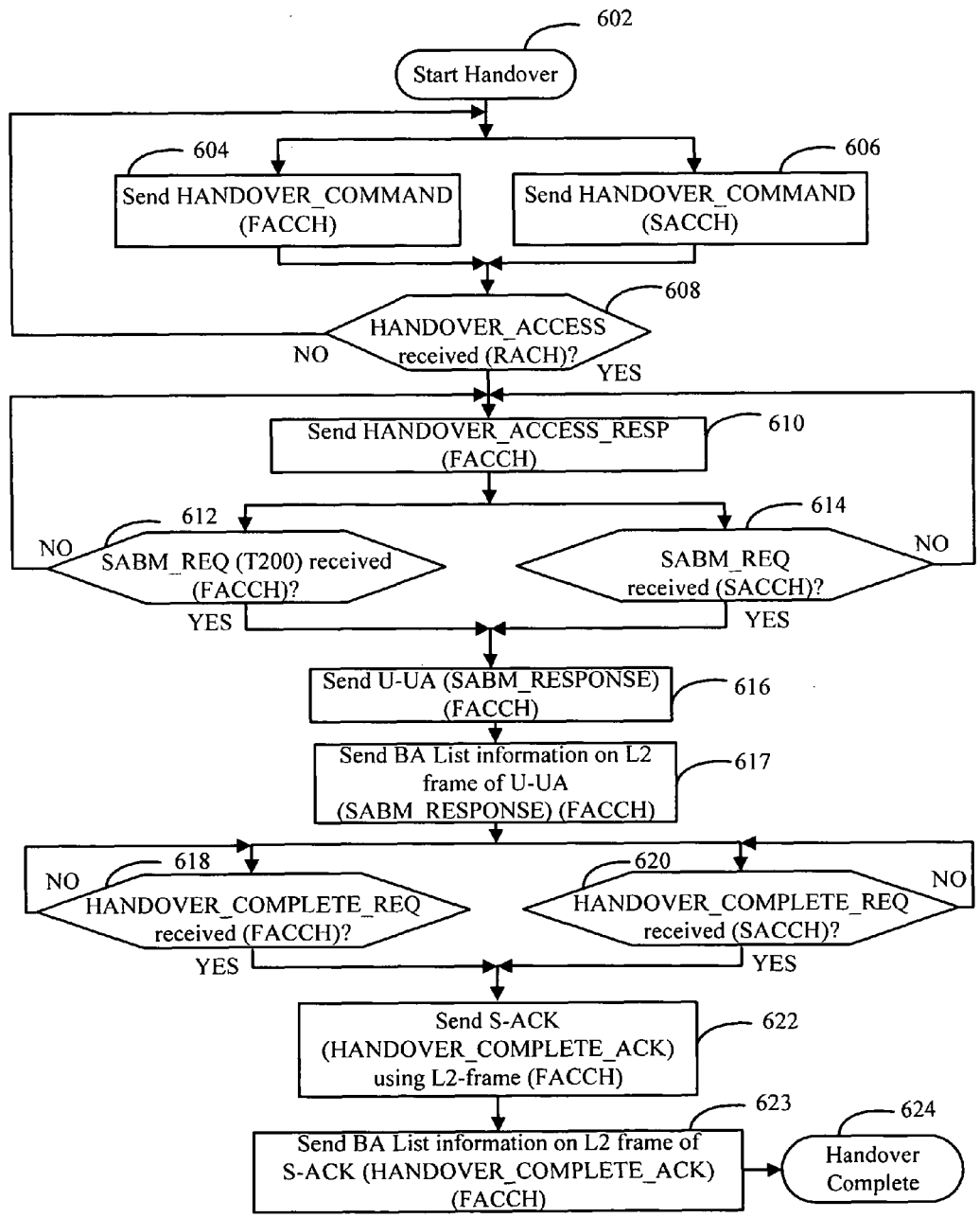
FIG. 6 is a flowchart of the handover procedure of the present application for the base station.

FIG. 5 is a flowchart for describing one illustrative method of a handover procedure for communicating handover information in a communications system (e.g. a GSM-based network) from the MS perspective. The method may be performed by a mobile station, and/or be embodied in a computer program product which includes a storage medium (e.g.

memory) and computer instructions stored in the storage medium which are executable by one or more processors. Preferably, parts of the handoff procedure are performed simultaneously on two different control channels so as to overcome any communications errors and avoid dropped calls during voice and data communications. Advantageously, the time required to perform the handover procedure is reduced.

Beginning at a start block 502 of FIG. 5, the handover procedure is initiated when the BSC or MSC determines that the RSSI and/or RXQUAL of mobile station 102 (FIG. 1) is below the predetermined threshold required for quality communications between mobile station 102 and station 118. At this point, the BSC or MSC instructs station 118 to send a HANDOVER_COMMAND command to mobile station 102. The HANDOVER_COMMAND command is a GSM command message that is defined in GSM standards documents and is part of a handover procedure. HANDOVER_COMMAND command is simultaneously sent by the station 118 as a SACCH message over the SACCH and as a FACCH message over the FACCH in order to insure that the handover procedure is performed properly and efficiently. Similar subjects listed in all capital letters in FIG. 5 and FIG. 6, and the respective text, are GSM commands that are defined in GSM standards documents.

Continuing in FIG. 5, mobile station 102 monitors to receive the HANDOVER_COMMAND command from station 118 over the FACCH (step 504 of FIG. 5) or SACCH (step 506 of FIG. 5). The HANDOVER_COMMAND command will be received at one or both of the FACCH and SACCH within receiver 212. The message which is received first in mobile station 102 is utilized by mobile station 102 and, if messages over both FACCH and SACCH are successfully received, the second one is discarded and not processed. If the message is not successfully decoded, it may be sent again by station 118 after a specified time interval as defined by the system controller. If HANDOVER_COMMAND command is not decoded properly, FACCH and SACCH decoders 414 and 410 (FIG. 4) will be cleared (step 510 of FIG. 5) and the decoding sequence will begin again with steps 504 and 506.

Once the HANDOVER_COMMAND command is received and decoded properly by receiver 212 (step 508 of FIG. 5), mobile station 102 will be tuned to the assigned traffic channel (TCH). Then DSP control and interface block 412 will instruct transmitter 214 to send a HANDOVER_ACCESS command to station 118 encoded as a RACH message over the RACH with one burst (step 512 of FIG. 5). Depending on handover types ('finely synchronized', 'non synchronized', 'pseudo-synchronized', or 'pre-synchronized'), a RACH message can be repeated 4 times or continuously until a timer (timer T3124) expires. Next, mobile station 102 monitors to receive a HANDOVER_ACCESS_RESP command from station 118 over the FACCH (step 514 of FIG. 5). The HANDOVER_ACCESS_RESP command containing physical layer information, such as a timing advance value, will be received at the FACCH within receiver 212, but if it is not, it may be sent again by station 118 after a specified time interval as defined by the BSC. If the HANDOVER_ACCESS_RESP command is not decoded properly, FACCH decoder 414 will be cleared and the decoding sequence will begin again with step 514. Alternatively, the handover procedure may be defined in such a way that requires that a missed decoded command message initiate the resending of the previous encoded command message. In the case of sending a command message again, if HANDOVER_ACCESS_RESP command is not received over the FACCH (step 514 of FIG. 5), then DSP control and interface block 412 will instruct transmitter 214 to send again a HANDOVER_ACCESS command to station 118 encoded as a RACH message over the RACH (step 512 of FIG. 5). This repeated sequence will continue until a HANDOVER_ACCESS_RESP command is received successfully over the FACCH (step 514 of FIG. 5) or until a predefined limit of iterations has occurred.

Once the HANDOVER_ACCESS_RESP is received and decoded properly by receiver 212 (step 514 of FIG. 5), DSP control and interface block 412 will instruct transmitter 214 to send to station 118 a SABM_REQ (T200) command encoded as a FACCH message over the FACCH (step 516 of FIG. 5) and a SABM_REQ command encoded as a SACCH message over the SACCH (step 518 of FIG. 5). Note that SABM is shorthand for set asynchronous balance mode (SABM). SABM_REQ commands sent over the FACCH utilize a GSM defined standard timer, T200. SABM_REQ commands sent over the SACCH commands do not utilize the T200 timer. Next, mobile station 102 monitors to receive a U-UA (SABM_RESPONSE) command from station 118 over the FACCH (step 520 of FIG. 5). The U-UA (SABM_RESPONSE) command will be received over the FACCH within receiver 212, but if it is not after a period of T200 duration, another SABM_REQ (T200) re-transmission is triggered until the total number of re-transmission times exceeds N200. If the U-UA (SABM_RESPONSE) command is not decoded properly, FACCH decoder 414 will be cleared and the decoding sequence will begin again with step 520.

Alternatively, the handover procedure may be defined in such a way that requires that a missed decoded command message initiate the resending of the previous encoded command message. In the case of sending a command message again, if the U-UA (SABM_RESPONSE) command is not received over the FACCH (step 520 of FIG. 5), then DSP control and interface block 412 will instruct transmitter 214 to send again to station 118 a SABM_REQ (T200) command encoded as a FACCH message over the FACCH (step 516 of FIG. 5) and a SABM_REQ command encoded as a SACCH message over the SACCH (step 518 of FIG. 5) (if the original SABM_REQ command has been transmitted completely over the SACCH, otherwise keep transmitting the remainder of the original SABM_REQ command as a SACCH message over the SACCH). This repeated sequence will continue until the U-UA (SABM_RESPONSE) command is received successfully over the FACCH (step 520 of FIG. 5) or until a predefined limit of iterations (e.g. N200 times) has occurred. GSM standards define repetition timer T200 as being in the range of 120 ms to 180 ms for full rate channel (or 157 ms to 203 ms for half rate channel), and define N200 as being equal to five.

Once the U-UA (SABM_RESPONSE) command is received and decoded properly by receiver 212 (step 520 of FIG. 5), DSP control and interface block 412 will instruct transmitter 214 to send a HANDOVER_COMPLETE_REQ command to station 118 encoded as a FACCH message over the FACCH (step 524 of FIG. 5) and as a SACCH message over the SACCH (step 526 of FIG. 5). Along with the U-UA (SABM_RESPONSE) command message received by the MS FACCH (step 520 of FIG. 5), mobile station 102 receives a first portion of a broadcast control channel (BCCH) allocation (BA) List information on the unused octets of the Layer-2 (L2) frame during the transmission (step 522 of FIG. 5).

Next, mobile station 102 monitors to receive an S-ACK (HANDOVER_COMPLETE_ACK) command from station 118 over the FACCH (step 528 of FIG. 5). The S-ACK (HANDOVER_COMPLETE_ACK) command will be received over the FACCH within receiver 212, but if it is not, or if the S-ACK (HANDOVER_COMPLETE_ACK) command is not decoded properly, MS FACCH decoder 414 will be cleared and the decoding sequence will begin again with step 528. Alternatively, the handover procedure may be defined in such a way that requires that a missed decoded command message initiate the resending of the previous encoded command message. In the case of sending a command message again, if the S-ACK (HANDOVER_COMPLETE_ACK) command is not received over the FACCH (step 528 of FIG. 5), then DSP control and interface block 412 will instruct transmitter 214 to send again a HANDOVER_COMPLETE_REQ command to station 118 encoded as a FACCH message over the FACCH (step 524 of FIG. 5) and as a SACCH message over the SACCH (step 526 of FIG. 5) if the former SACCH message has been transmitted completely. This repeated sequence will continue until the S-ACK (HANDOVER_COMPLETE_ACK) command is received successfully over the FACCH (step 528 of FIG. 5) or until a predefined limit of iterations has occurred. Along with the S-ACK (HANDOVER_COMPLETE_ACK) command received by the MS FACCH (step 528 of FIG. 5), mobile station 102 also receives a second set of BA list information, consisting of pertinent information including a new cell's location and configuration information (e.g. cell identity, location area code, network color code permitted, cell discontinuous transmission configuration, and radio link timeout value) on the unused octets of the L2 frame during the transmission (step 530 of FIG. 5). Once the S-ACK (HANDOVER_COMPLETE_ACK) command is received and decoded properly by receiver 212 (step 528 of FIG. 5) and a second or remaining portion of the BA list is received on the L2 frame (step 530 of FIG. 5), the handover procedure is complete (step 532 of FIG. 5).

FIG. 6 is a flowchart for describing one illustrative method of a handover procedure for communicating handover information in a communications system (e.g. a GSM-based network) from the BS perspective. The method may be performed by a BS, and/or be embodied in a computer program product which includes a storage medium (e.g. memory) and computer instructions stored in the storage medium which are executable by one or more processors. Preferably, the handoff procedure is performed simultaneously on two different control channels so as to overcome any communications errors and avoid dropped calls during voice and data transmissions. Advantageously, the time required to perform the handover procedure is reduced.

Beginning at a start block 602 of FIG. 6, the handover procedure is initiated when the MSC determines that the RSSI and/or RXQUAL level of the MS is below the predetermined threshold required for quality communications between the MS and the BS. Once the BSC determines that a handover procedure is to be initiated for the target MS, the BSC instructs the BS to send the HANDOVER_COMMAND command to mobile station 102 as an encoded FACCH message over the FACCH (step 604 of FIG. 6) and as an encoded SACCH message over the SACCH (step 606 of FIG. 6). The HANDOVER_COMMAND command is a standardized GSM command that is part of the handover procedure. The HANDOVER_COMMAND command is simultaneously sent over the SACCH and FACCH in order to insure that the handover procedure is performed properly and efficiently.

Next, station 118 monitors to receive a HANDOVER_ACCESS command from mobile station 102 over the RACH (step 608 of FIG. 6). The HANDOVER_ACCESS command will be received at the RACH within the BS receiver, but if it is not, the handover procedure may be defined in such a way that requires that a missed decoded command message initiate the resending of the previous encoded command message. In the case of sending a command message again, if the HANDOVER_ACCESS command is not received over the RACH (step 608 of FIG. 6), then the BS DSP control will instruct the BS transmitter to send again a HANDOVER_COMMAND command to mobile station 102 encoded as a FACCH message over the FACCH (step 604 of FIG. 6) and as a SACCH message over the SACCH if the previous HANDOVER_COMMAND command has been transmitted completely as a SACCH message over the SACCH. Otherwise keep transmitting the remainder of the previous HANDOVER_COMMAND command (step 606 of FIG. 6) as a SACCH message over the SACCH. This repeated sequence will continue until the HANDOVER_ACCESS command is received successfully over the RACH (step 608 of FIG. 6) or until a predefined limit of iterations has occurred.

Alternatively, the handover procedure may be defined in such a way that requires that a missed decoded command message initiate the resending of the command message which was not received due to some interference, poor signal quality, or other interfering condition. The message may be sent again by mobile station 102 after a specified time interval as defined by MS software code. If the HANDOVER_ACCESS command is not decoded properly, BS RACH decoder will be cleared and the decoding sequence may begin again with step 608. Another scenario is a combination of the two above conditions, in which case a failure to decode the HANDOVER_ACCESS command after a certain time period, causes station 118 to monitor the RACH again for the HANDOVER_ACCESS command for a predefined time period, and then after the predefined time period has expired, station 118 will again send the HANDOVER_COMMAND command as a FACCH command over the FACCH (step 604 of FIG. 6) and as a SACCH message over the SACCH if the previous HANDOVER_COMMAND command has been transmitted completely as a SACCH message over the SACCH. Otherwise keep transmitting the remainder of the previous HANDOVER_COMMAND command (step 606 of FIG. 6). This repeated sequence will continue until the HANDOVER_ACCESS command is received successfully over the FACCH (step 608 of FIG. 6) or until a predefined limit of iterations has occurred.

Once the HANDOVER_ACCESS command is received and decoded properly by BS receiver (step 608 of FIG. 6), the BS control will instruct BS transmitter to send a HANDOVER_ACCESS_RESP command to mobile station 102 encoded as a FACCH message over the FACCH (step 610 of FIG. 6). Next, station 118 monitors to receive from mobile station 102 a SABM_REQ (T200) command over the FACCH (step 612 of FIG. 6) or a SABM_REQ command over the SACCH (step 614 of FIG. 6). The SABM_REQ (T200) command will be received as a FACCH message at the FACCH (step 612 of FIG. 6) or the SABM_REQ command will be received as a SACCH message at the SACCH (step 614 of FIG. 6) within the BS receiver. The message which is received first in station 118 is utilized by station 118 and, if messages over both FACCH and SACCH are successfully received, the second one is discarded and not processed.

If the message is not successfully received, the handover procedure may be defined in such a way that requires that a missed decoded command message initiate the resending of the previous encoded command message. In the case of sending a command message again, if the SABM_REQ (T200) command is not received over the FACCH (step 612 of FIG. 6) or the SABM_REQ command is not received over the SACCH (step 614 of FIG. 6), then the BS DSP control will instruct the BS transmitter to send again a HANDOVER_AC- CESS_RESPONSE command to mobile station 102 encoded as a FACCH message over the FACCH (step 610 of FIG. 6). This repeated sequence will continue until the SABM_REQ (T200) command is received successfully over the FACCH (step 612 of FIG. 6) or the SABM_REQ command is received successfully over the SACCH (step 614 of FIG. 6) or until a predefined limit of iterations has occurred.

Alternatively, the handover procedure may be defined in such a way that requires that a missed decoded command message initiate the resending of the command message which was not received due to some interference, poor signal quality, or other interfering condition. The message may be sent again by mobile station 102 after a specified time interval as defined in mobile station 102. If the SABM_REQ (T200) command and SABM_REQ command are not decoded properly, the BS FACCH and BS SACCH decoders will be cleared and the decoding sequence may begin again with steps 612 and 614. Another scenario is a combination of the two above conditions, in which case a failure to decode the SABM_REQ (T200) command and SABM_REQ command after a certain time period causes station 118 to monitor again the FACCH for the SABM_REQ (T200) command and the SACCH for the SABM_REQ command for a predefined time period. After the predefined time period has expired, station 118 will again send the HANDOVER_ACCESS_RESP as a FACCH message over the FACCH in step 610. This repeated sequence will continue until the SABM_REQ (T200) command is received successfully over the BS FACCH (step 612 of FIG. 6) or until the SABM_REQ command is received successfully over the BS SACCH (step 614 of FIG. 6) or until a predefined limit of iterations has occurred.

Once the SABM_REQ (T200) command is received and decoded properly by BS receiver as a FACCH message over the FACCH (step 612 of FIG. 6) or SABM_REQ command is received and decoded properly by BS receiver as a SACCH message over the SACCH (step 614 of FIG. 6), the BS control will instruct BS transmitter to send a U-UA (SABM_RESPONSE) command to mobile station 102 encoded as a FACCH message over the FACCH (step 616 of FIG. 6). Along with the U-UA (SABM_RESPONSE) command FACCH message sent by station 118 (step 616 of FIG. 6) station 118 also sends a first portion of BA list information on otherwise unused octets of the Layer-2 (L2) frame during the transmission (step 617 of FIG. 6). Next, station 118 monitors to receive a HANDOVER_COMPLETE_REQ command from mobile station 102 over the FACCH (step 618 of FIG. 6) or SACCH (step 620 of FIG. 6). The HANDOVER_COMPLETE_REQ command will be received as a FACCH message at the FACCH (step 618 of FIG. 6) or as a SACCH message at the SACCH (step 620 of FIG. 6) within the BS receiver. The message which is received first in station 118 is utilized by station 118 and, if messages over both FACCH and SACCH are successfully received, the second one is discarded and not processed.

If the HANDOVER_COMPLETE_REQ command message is not successfully received/decoded, the handover procedure may be defined in such a way that requires that a missed decoded command message initiate station 118 to wait until HANDOVER_COMPLETE_REQ command is received successfully. If the HANDOVER_COMPLETE_REQ command is not received over the FACCH (step 618 of FIG. 6) or the SACCH (step 620 of FIG. 6), then station 118 FACCH and SACCH decoders will be cleared, and the BS receiver will continue to monitor the FACCH and SACCH until the HANDOVER_COMPLETE_REQ command is received successfully over the FACCH (step 618 of FIG. 6) or the SACCH (step 620 of FIG. 6). The handover procedure may allow station 118 to wait for the HANDOVER_COMPLETE_REQ command to be sent again since, as stated in relation to FIG. 5, mobile station 102 will continue to periodically send HANDOVER_COMPLETE_REQ commands as long as the S-ACK (HANDOVER_COMPLETE) command is not received by mobile station 102.

Once the HANDOVER_COMPLETE_REQ command is received and decoded properly by the BS receiver as a FACCH message over the FACCH (step 618 of FIG. 6) or as a SACCH message over the SACCH (step 620 of FIG. 6), the BS control will instruct BS transmitter to send a S-ACK (HANDOVER_COMPLETE_ACK) command to mobile station 102 encoded as a FACCH message over the FACCH (step 622 of FIG. 6). Along with the S-ACK (HANDOVER_COMPLETE_ACK) command FACCH message sent by station 118 (step 622 of FIG. 6) station 118 also sends a second or remaining portion of BA list information on the otherwise unused octets of the Layer-2 (L2) frame during the transmission (step 623 of FIG. 6). Once the S-ACK (HANDOVER_COMPLETE_ACK) command is encoded and sent by the BS transmitter (step 622 of FIG. 6) along with the BA list information, new cell's location and configuration information, in the L2 frame (step 623 of FIG. 6), the handover procedure is complete (step 624 of FIG. 6). BA list information, the new cell's location and configuration information include cell identity, location area code, network color code permitted, cell discontinuous transmission configuration, and radio link timeout value.

Figure 7:
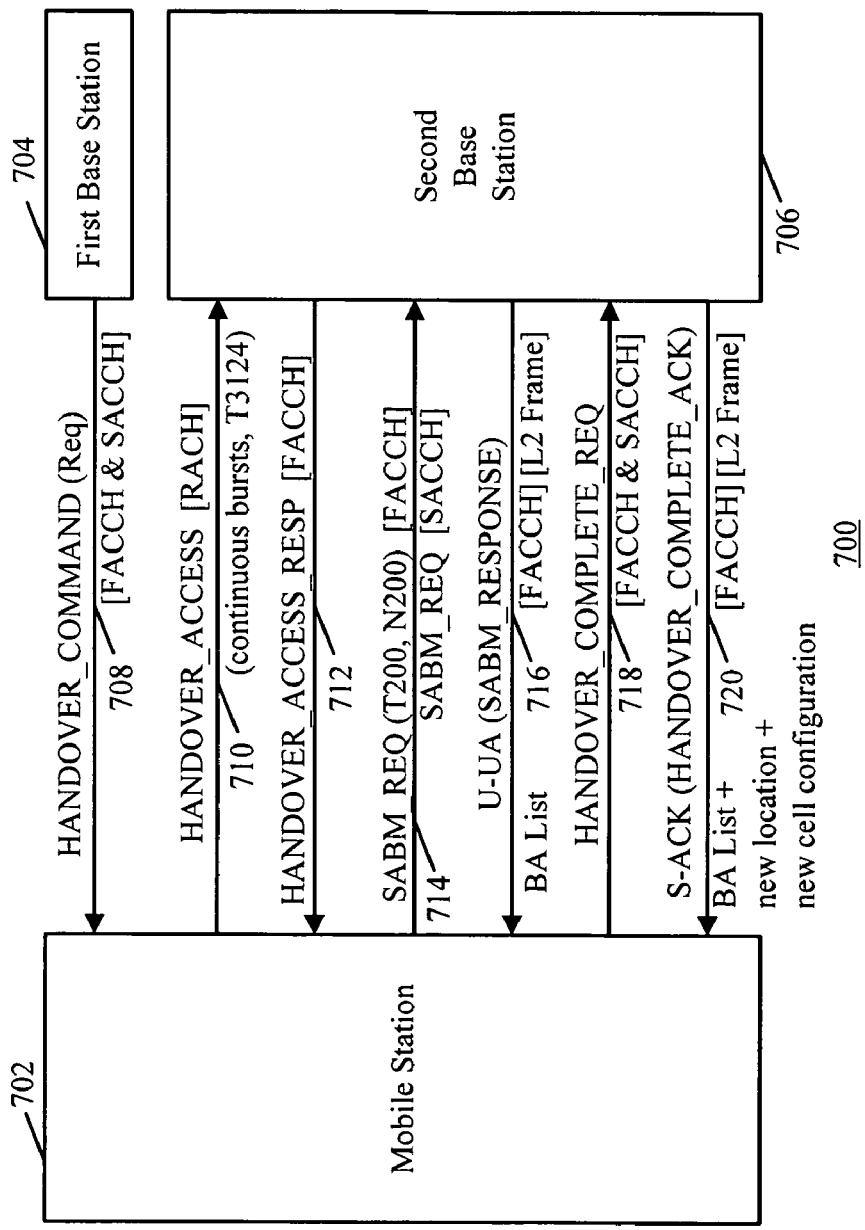
FIG. 7 is a process flow diagram of the handover procedure of the present application.

FIG. 7 is an illustrative example of a GSM handover sequence 700 between a mobile station (MS) 702 (e.g. mobile station 102 of FIG. 1, mobile station 202 of FIG. 2) from a first base station (BS) (or network) 704 to a second base station (BS) (or network) 706. GSM handover sequence 700 shows specific steps taken during the handover procedure in a GSM system in sequential order in which the steps are taken, and media (FACCH or SACCH) for which data is being transferred during each step. The procedure shown in this diagram is the same step-by-step procedure shown in flowcharts in FIG. 5 and FIG. 6, but intended to provide a more concise view of the handover procedure between MS and BS. As described earlier, the handover procedure will take place when an MS has a voice or data call established. During the active call, once the signal quality is degraded, the handover procedure will be initiated in order to provide continuous communications and quality for the current call. The handover procedure is initiated by the BSC when determining that the RSSI and/or RXQUAL has degraded. The BSC receives frequent and periodic signal strength measurements from the MS during every call. Once the RSSI and/or RXQUAL has degraded below a predefined level, the BSC instructs a BS to initiate the handover procedure.

In FIG. 7, the handover procedure begins with first BS 704 sending a HANDOVER_COMMAND command 708 to mobile station 702 as a FACCH message over FACCH and as a SACCH message over the SACCH. First BS 704 is defined as the serving base station currently in communications with mobile station 702. Once HANDOVER_COMMAND command 708 is received by mobile station 702 through its FACCH decoder or SACCH decoder, mobile station 702 responds by sending HANDOVER_ACCESS 710 command to second BS 706 as a RACH message over the RACH. Second BS 706 is defined as the destination base station, and operates similarly to first BS 704 but is physically different and in a different physical location. Once HANDOVER_ACCESS command 710 is received by second BS 706 through its FACCH decoder, second BS 706 responds by sending a HANDOVER_ACCESS_RESP 712 command containing physical layer information to an mobile station 702 as a FACCH message over the FACCH. Once the HANDOVER_CCESS_RESP command 712 is received by mobile station 702 through its FACCH decoder, mobile station 702 responds by sending to second BS 706 a SABM_REQ (T200) command 714 as a FACCH message over the FACCH and a SABM_REQ command 714 as a SACCH message over the SACCH.

Once BS 706 receives SABM_REQ (T200) command 714 through its FACCH decoder or SABM_REQ command 714 through its SACCH decoder, second BS 706 responds by sending a U-UA (SABM_RESPONSE) 716 command to mobile station 702 as a FACCH message over the FACCH. In addition to the U-UA (SABM_RESPONSE) command 716 being sent on the FACCH, second BS 706 also begins sending a channel information list which is referred to as a BCCH (broadcast control channel) allocation (BA) list in GSM. A first portion of the BA list information is sent in otherwise unused portions of the layer-2 (L2) frame.

Once U-UA (SABM_RESPONSE) command 716 is received by mobile station 702 through its FACCH decoder, mobile station 702 responds by sending a HANDOVER_COMPLETE_REQ 718 command to second BS 706 as a FACCH message over the FACCH and as a SACCH message over the SACCH. Once HANDOVER_COMPLETE_REQ 718 command is received by second BS 706 through its FACCH decoder or SACCH decoder, second BS 706 responds by sending an S-ACK (HANDOVER_COMPLETE_ACK) command 720 to mobile station 702 as a FACCH message over the FACCH. In addition to the S-ACK (HANDOVER_COMPLETE_ACK) command 720 being sent on the FACCH, second BS 706 also continues sending BA list information. A second or remaining portion of BA list information and the new cell's location and configuration information (e.g. cell identity, location area code, network color code permitted, cell discontinuous transmission configuration, and radio link timeout value) is sent in otherwise unused portions of the L2 frame. Once S-ACK (HANDOVER_COMPLETE_ACK) 720 command and BA List are received and decoded properly by mobile station 702, the handover procedure is complete.

Figure 8:
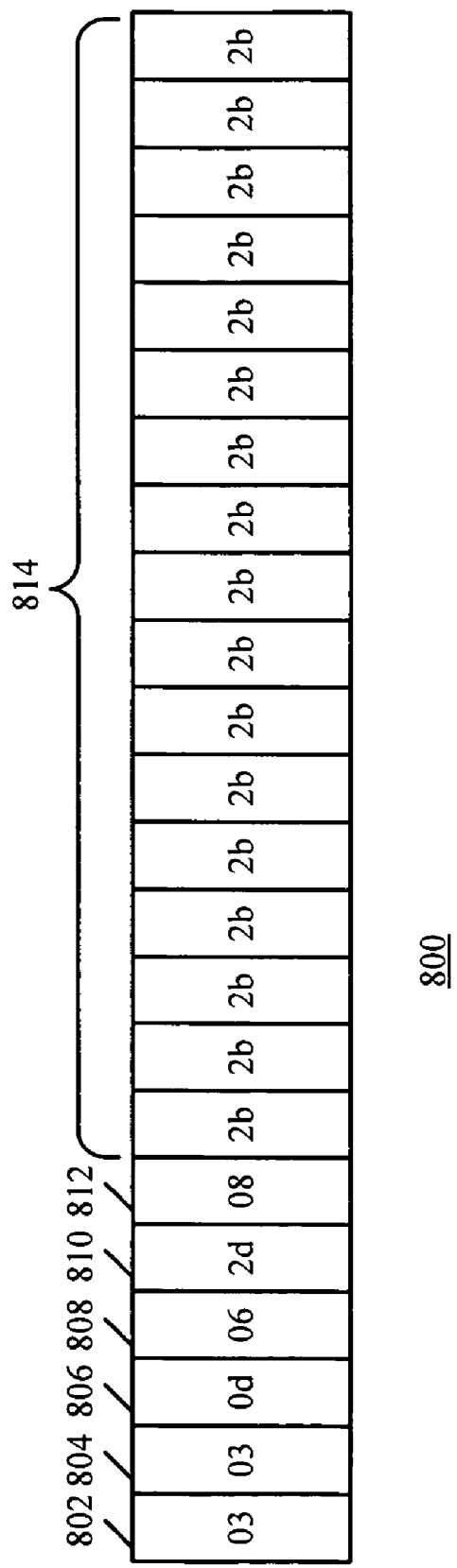
FIG. 8 is a data format of a GSM layer-2 frame.

FIG. 8 is a bit pattern diagram of a GSM layer-2 (L2) frame 800 as received by the MS. L2 frame 800 may be referred to as a channel coding frame, and is typically twenty-three octets in length. One octet is eight bits in length. In this example, L2 frame 800, octets 802, 804, 806, 808, 810, and 812 contain specific information pertaining to a message being sent from one station to another. The octet values shown in L2 frame 800 are representative of a "Physical Layer" message that is similar to if not identical to the U-UA (SABM_RESPONSE) command message. A hexadecimal value of "2B" in any octet indicates a null, or unused, location. As apparent, the traditional U-UA (SABM_RESPONSE) command message contains seventeen unused octets as shown in bracketed grouping 814. A portion of the BA list information is inserted within these positions during the handover procedure.

Although not shown in FIG. 8, the S-ACK (HANDOVER_COMPLETE_ACK) command also uses the L2 frame format and leaves twenty otherwise unused octets in its message. Combining the seventeen unused octets in the U-UA (SABM_RESPONSE) command message with the twenty unused octets in the S-ACK (HANDOVER_COMPLETE_ACK) command message, the handover procedure has thirty-seven unused octets in the final two transmitted command messages from the BS to MS. These thirty-seven unused octets are will contain the remaining portion of the BA list information. This information otherwise or additionally requires an additional burst period to transfer the BA list to the MS after the handover procedure. The use of the unused octets in the U-UA (SABM_RESPONSE) command and the S-ACK (HANDOVER_COMPLETE_ACK) command messages decreases the time required to complete the handover procedure.

The method described herein, where the same handover information is sent simultaneously as a FACCH message on the FACCH and as a SACCH message on the SACCH, reduces handover delays and may prevent dropped calls during handover attempts. The additional method of utilizing previously unused L2 frame space to send BA list information may further reduce the time required to confirm the adequacy of the handover. This method is recommended for handovers in weak radio coverage areas (e.g. RSSI less than −102 dBm; if fast moving, then less than −88 dBm).

Thus, a mobile communication device assists in a handover procedure between a first base station and a second base station using reliable and efficient techniques. The mobile device has a wireless transceiver and one or more processors coupled to the wireless transceiver. In one illustrative example, the one or more processors of the mobile device are operative to maintain a voice or data call over a traffic channel with use of the wireless transceiver; cause handover information of the handover procedure to be transmitted over a first control channel (e.g. FACCH) with use of the wireless transceiver during the voice or data call; and cause the same handover information of the handover procedure to be transmitted over a second control channel (e.g. SACCH) during the voice or data call. Further, the one or more processors may be operative to cause a message for the handover procedure to be transmitted in a layer-2 (L2) frame with use of the wireless transceiver during the voice or data call; and cause updated system information (e.g. an updated BA list) to be transmitted earlier in the L2 frame with use of the wireless transceiver during the voice or data call.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method in a mobile communication device for use in performing a handover procedure for a voice or data call from a first base station to a second base station, the method comprising: maintaining a the voice or data call over a traffic channel with the first base station; receiving, at the mobile communication device from the first base station, a handover command message for commanding execution of the handover procedure for the voice or data call from the first base station to the second base station; in response to receiving the handover command message, and prior to completion of the handover procedure: receiving, at the mobile communication device, a timing advance value from the second base station; after receiving the timing advance value, transmitting, from the mobile communication device, over a fast associated control channel with the second base station, a handover message for executing the handover procedure for the voice or data call; and additionally transmitting, from the mobile communication device, over a slow associated control channel with the second base station, the same handover message for executing the handover procedure for the voice or data call, which thereby assists in preventing the voice or data call from being dropped during the handover procedure.

2. The method of claim 1, further comprising:
encoding the handover message for executing the handover procedure in accordance with a first encoding format for transmission over the fast associated control channel; and
additionally encoding the same handover message for executing the handover procedure in accordance with a second encoding format for transmission over the slow associated control channel.

3. The method of claim 1, wherein the step of causing the handover message for executing the handover procedure to be transmitted over the fast associated control channel is performed over a first time period and the step of causing the same handover message for executing the handover procedure to be transmitted over the slow associated control channel is performed over a second time period which overlaps with the first time period.

4. The method of claim 1, further comprising: transmitting from the mobile communication device, over a random access channel with the second base station, a handover access message; and receiving the timing advance value from the second base station in response to transmitting the handover access message.

5. The method of claim 1, wherein the mobile communication device is configured in accordance with Global System for Mobile communications, which comprises a fast associated control channel (FACCH) and a slow associated control channel (SACCH), and the timing advance value is for synchronizing with the second base station.

6. The method of claim 1, wherein the handover message comprises a set asynchronous balance mode (SABM) message.

7. The method of claim 1, wherein the handover message comprises a HANDOVER_COMPLETE_REQ message.

8. The method of claim 1, which thereby assists in preventing the voice or data call from being dropped during the handover procedure when the handover message over the fast associated control channel is not received by the second base station.

9. The method of claim 1, further comprising:
monitoring the fast associated control channel for the handover message for executing the handover procedure;
monitoring the slow associated control channel for the same handover message for executing the handover procedure; and
when there is a failure in receiving the handover message for executing the handover procedure over the fast associated control channel: processing the handover message for executing the handover procedure received over the slow associated control channel.

10. The method of claim 1, further comprising:
monitoring the fast associated control channel for handover message for executing the handover procedure;
monitoring the slow associated control channel for the same handover message for executing the handover procedure;
when there is a failure in receiving the handover message for executing the handover procedure over the fast associated control channel: processing the handover message for executing the handover procedure received over the slow associated control channel for performing the handover procedure; and
when there is a failure in receiving the handover message for executing the handover procedure over the slow associated control channel: processing the handover message for executing the handover procedure received over the fast associated control channel.

11. A mobile communication device, comprising:
a wireless transceiver;
one or more processors coupled to the wireless transceiver;
the one or more processors being configured to:
  maintain, with use of the wireless transceiver, a voice or data call over a traffic channel with a first base station;
  receive, via the wireless transceiver from the first base station, a handover command message for commanding execution of a handover procedure for the voice or data call from the first base station to a second base station;
  in response to receiving the handover command message, and prior to completion of the handover procedure:
    receive, via the wireless transceiver, a timing advance value from the second base station;
    after receiving the timing advance value, transmit, via the wireless transceiver, over a fast associated control channel with the second base station, a handover message for executing the handover procedure for the voice or data call; and
    additionally transmit, via the wireless transceiver, over a slow associated control channel with the second base station, the same handover message for executing the handover procedure for the voice or data call, which thereby assists in preventing the voice or data call from being dropped during the handover procedure.

12. The mobile communication device of claim 11, wherein the one or more processors are further configured to:
encode the handover message for executing the handover procedure in accordance with a first encoding format for transmission over the fast associated control channel; and
additionally encode the same handover message for executing the handover procedure in accordance with a second encoding format for transmission over the slow associated control channel.

13. The mobile communication device of claim 11, wherein the one or more processors are further configured to cause the handover message for executing the handover procedure to be transmitted over the fast associated control channel over a first time period and cause the same handover message for executing the handover procedure to be transmitted over the slow associated control channel over a second time period which overlaps with the first time period.

14. The mobile communication device of claim 11, wherein the one or more processors are further configured to transmit, via the wireless transceiver, over a random access channel with the second base station, a handover access message; and receive, via the wireless transceiver, the timing advance value from the second base station in response to transmitting the handover access message.

15. The mobile communication device of claim 11, wherein the wireless transceiver is configured in accordance with Global System for Mobile communications (GSM), which comprises a fast associated control channel (FACCH) and a slow associated control channel (SACCH), and the timing advance value is for synchronizing with the second base station.

16. The mobile communication device of claim 11, wherein the handover message comprises one of a HANDOVER_COMPLETE_REQ message and a set asynchronous balance mode (SABM) message.

17. A method for use in performing a handover procedure from a first base station to a second base station for a mobile communication device which operates in a voice or data call, the method comprising:
 causing a handover command message for commanding execution of the handover procedure to be sent, via the first base station, to the mobile communication device;
 in response to the sending of the handover command message for commanding the execution of the handover procedure, and prior to completion of the handover procedure:
  transmitting, from the second base station, a timing advance value to the mobile communication device;
  after transmitting the timing advance value, monitoring, at the second base station, a fast associated control channel established with the mobile communication device for a handover message for executing the handover procedure for the voice or data call;
  additionally monitoring, at the second base station, a slow associated control channel established with the mobile communication device for the same handover message for executing the handover procedure for the voice or data call; and
  when there is a failure in receiving the handover message for executing the handover procedure over the fast associated control channel: processing the handover message received over the slow associated control channel for performing the handover procedure, which thereby assists in preventing the voice or data call from being dropped during the handover procedure.

18. The method of claim 17, further comprising:
 when there is a failure in receiving the handover message for executing the handover procedure over the slow associated control channel: processing the handover message for executing the handover procedure received over the fast associated control channel for performing the handover procedure.

19. The method of claim 17, wherein the step of causing the handover message for executing the handover procedure to be transmitted over the fast associated control channel is performed over a first time period and the step of causing the same handover message for executing the handover procedure to be transmitted over the slow associated control channel is performed over a second time period which overlaps with the first time period.

20. The method of claim 17, further comprising:
 monitoring, at the second base station, a random access channel with the mobile communication device for receiving a handover access message; and
 transmitting the timing advance value to the mobile communication device in response to receiving the handover access message.

21. The method of claim 17, wherein the wireless transceiver is configured in accordance with Global System for Mobile communications (GSM), which comprises a fast associated control channel (FACCH).

22. The method of claim 17, wherein the handover message comprises a set asynchronous balance mode (SABM) message.

23. The method of claim 17, wherein the handover message comprises a HANDOVER_COMPLETE_REQ message.

24. The method of claim 17, wherein the wireless transceiver is configured in accordance with Global System for Mobile communications (GSM), which comprises a slow associated control channel (SACCH).

25. A mobile communication device configured to facilitate a handover procedure from a first base station to a second base station, comprising:
 a wireless transceiver;
 one or more processors coupled to the wireless transceiver;
 the one or more processors being configured to:
  maintain, via the wireless transceiver, a voice or data call over a traffic channel with the first base station;
  transmit, via the wireless transceiver to the first base station, signal strength measurements of the first base station and the second base station;
  when the signal strength measurement of the first base station is below a predefined threshold level:
   monitor, via the wireless transceiver, a fast associated control channel with the first base station for a handover command message for commanding execution of the handover procedure for the voice or data call from the first base station to the second base station;
   additionally monitor, via the wireless transceiver, a slow associated control channel with the first base station for the same handover command message for commanding execution of the handover procedure for the voice or data call, which thereby assists in preventing the voice or data call from being dropped;
  in response to receiving the handover command message over one of the fast and the slow associated control channels:
   transmit, via the wireless transceiver, a handover access message to the second base station;
   receive, via the wireless transceiver, a timing advance value from the second base station in response to transmitting the handover access message;
   after receiving the timing advance information, transmit, via the wireless transceiver, over the fast associated control channel with the second base station, a handover message for executing the handover procedure for the voice or data call; and
   additionally transmit, via the wireless transceiver, over the slow associated control channel with the second base station, the same handover message for executing the handover procedure for the voice or data call, which thereby assists in preventing the voice or data call from being dropped.

26. The mobile communication device of claim 25, wherein the wireless transceiver is configured in accordance with Global System for Mobile communications (GSM), which comprises a fast associated control channel (FACCH).

27. The mobile communication device of claim 25, wherein the handover command message comprises a HANDOVER_COMMAND message, and the handover message comprises one of a HANDOVER_COMPLETE_REQ message and a set asynchronous balance mode (SABM) message.

28. The mobile communication device of claim 25, wherein the one or more processors are further configured to transmit, via the wireless transceiver, over a random access channel with the base station, the handover access message.

29. The mobile communication device of claim 25, wherein the wireless transceiver is configured in accordance with Global System for Mobile communications (GSM), which comprises a slow associated control channel (SACCH).

30. The mobile communication device of claim 25 wherein, by performing the recited actions, there is a reduced delay in the handover procedure to prevent the voice or the data call from being dropped.

31. A method for use in performing a handover procedure from a first base station to a second base station for a mobile communication device which operates in a voice or data call, the method comprising: causing a handover command message for commanding execution of the handover procedure to be sent to the mobile communication device, via the first base station, for handing over the voice or the data call to the second base station; after the handover command message is sent: causing a set asynchronous-balance mode (SABM) message to be transmitted, from the second base station to the mobile communication device, in a layer-2 (L2) frame; and causing updated, system information which includes a neighbor cell (BA) list to be transmitted, from the second base station to the mobile communication device, along with the SABM message in the same L2 frame that carries the SABM message, which thereby decreases the time required to complete the handover procedure.

32. The method of claim 31, wherein the SABM message comprises a physical information type message.

33. The method of claim 31, further comprising:
after the SABM message is transmitted:
causing a handover complete acknowledgement type message to be transmitted, from the second base station to the mobile communication device, in an L2 frame; and
causing additional updated system information which includes additional neighbor cell (BA) list information to be transmitted, from the second base station to the mobile communication device, in the same L2 frame that carries the handover complete acknowledgement message, which thereby decreases the time required to complete the handover procedure.

34. The method of claim 33, wherein the additional updated system information further comprises one of cell identity information, location area identity information, cell options information, and network control center (NCC) permission information.

35. The method of claim 31, which decreases the time required to complete the handover procedure to prevent the voice or the data call from being dropped.

36. The method of claim 31, wherein the SABM message is transmitted over a forward associated control channel (FACCH).

37. A mobile communication device configured to facilitate a handover procedure from a first base station to a second base station during a voice or a data call, comprising:
a wireless transceiver;
one or more processors coupled to the wireless transceiver;
the one or more processors being configured to:
receive, from the first base station via the wireless transceiver, a handover command message for commanding execution of the handover procedure to the second base station;
after receiving the handover command message:
receive, in a layer-2 (L2) frame, from the second base station via the wireless transceiver, a set asynchronous balance mode (SABM) message; and
receive, along with the SABM message in the same L2 frame that carries the SABM message, from the second base station via the wireless transceiver, updated system information which includes a neighbor cell (BA) list, which thereby decreases the time required to complete the handover procedure.

38. The mobile communication device of claim 37, wherein the SABM message comprises a physical information type message.

39. The mobile communication device of claim 37, further comprising:
after receiving the SABM message:
receive, in an L2 frame, from the second base station via the wireless transceiver, a handover complete acknowledgement type message; and
receive, in the same L2 frame that carries the handover complete acknowledgement type message, from the second base station via the wireless transceiver, additional updated system information which includes additional neighbor cell (BA) list information, which thereby decreases the time required to complete the handover procedure.

40. The mobile communication device of claim 39, wherein the additional updated system information further comprises one of cell identity information, location area identity information, cell options information, and network control center (NCC) permission information.

41. The mobile communication device of claim 37, wherein the SABM message is transmitted over a forward associated control channel (FACCH).

* * * * *